United States Patent
Nemoto (10) Patent No.: US 7,689,126 B2
(45) Date of Patent: Mar. 30, 2010

(54) WAVELENGTH DISPERSION COMPENSATION CONTROL METHOD AND WAVELENGTH DISPERSION COMPENSATION CONTROL DEVICE

(75) Inventor: Nobuyuki Nemoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/335,807

(22) Filed: Dec. 16, 2008

(65) Prior Publication Data

US 2009/0162074 A1 Jun. 25, 2009

(30) Foreign Application Priority Data

Dec. 20, 2007 (JP) ............................. 2007-328814

(51) Int. Cl.
*H04J 14/02* (2006.01)
*H04B 10/00* (2006.01)
*H04B 10/12* (2006.01)

(52) U.S. Cl. ........................... 398/81; 398/159; 398/147

(58) Field of Classification Search ................... 398/29, 398/81, 147–149, 158, 159
See application file for complete search history.

(56) References Cited

U.S. PATENT DOCUMENTS

| 6,646,805 | B2 | 11/2003 | Mitamura et al. |
| 7,477,848 | B2 * | 1/2009 | Ooi et al. ..................... 398/147 |
| 2003/0002112 | A1 * | 1/2003 | Hirano et al. ................ 359/161 |
| 2007/0297804 | A1 * | 12/2007 | Honda et al. ................ 398/147 |

FOREIGN PATENT DOCUMENTS

| JP | 03-079141 | 4/1991 |
| JP | 2002-258207 | 9/2002 |

* cited by examiner

*Primary Examiner*—Dalzid Singh
(74) *Attorney, Agent, or Firm*—Staas & Halsey LLP (57) ABSTRACT

A wavelength dispersion compensation control method determining whether a clock component is contained in an optical signal received from an optical transmission path and, if a clock component if contained in the optical signal, extracting the clock component, and stopping control of a variable wavelength dispersion compensator when no clock component is extracted.

6 Claims, 12 Drawing Sheets

WAVELENGTH DISPERSION COMPENSATION CONTROL METHOD AND WAVELENGTH DISPERSION COMPENSATION CONTROL DEVICE

CROSS-REFERENCE TO RELATED APPLICATIONS

This application is based upon and claims the benefit of priority of the prior Japanese Patent Application No. 2007-328814, filed on Dec. 20, 2007, the entire contents of which are incorporated herein by reference.

FIELD

The embodiments discussed herein are related to a variable wavelength dispersion compensation control method and a variable wavelength dispersion compensation control device that controls a variable wavelength dispersion compensator to vary a wavelength dispersion compensation value.

BACKGROUND

A network that enables transmission of DWDM (Dense Wavelength Division Multiplexing) has been recently constructed in connection with an increase of transmission capacity. Furthermore, ultrahigh-speed products having a transmission speed of 40 Gb/s have been commercially available to respond to a further increase of the information amount, and it has been difficult to compensate a large wavelength dispersion by a optical receiver. Under such a situation, the opportunity for using VDC (Variable Dispersion Compensator) for an individual transponder has increased to satisfy required optical characteristic also in a long-distance transmission.

When VDC is used, various operation sequences based on the presence or absence of an optical input are considered. Furthermore, in the case of using a structure in which a three-dimensional mirror is set to be movable in VDC to vary a wavelength dispersion compensation value, when the three-dimensional mirror is moved at any time, VDC is broken and thus the lifetime of the apparatus itself in which VDC is mounted is shortened because the movable portion is worn away and the lifetime of a position sensor, etc. are relatively short. Therefore, the apparatus must be designed in consideration of this lifetime.

Figure 1:
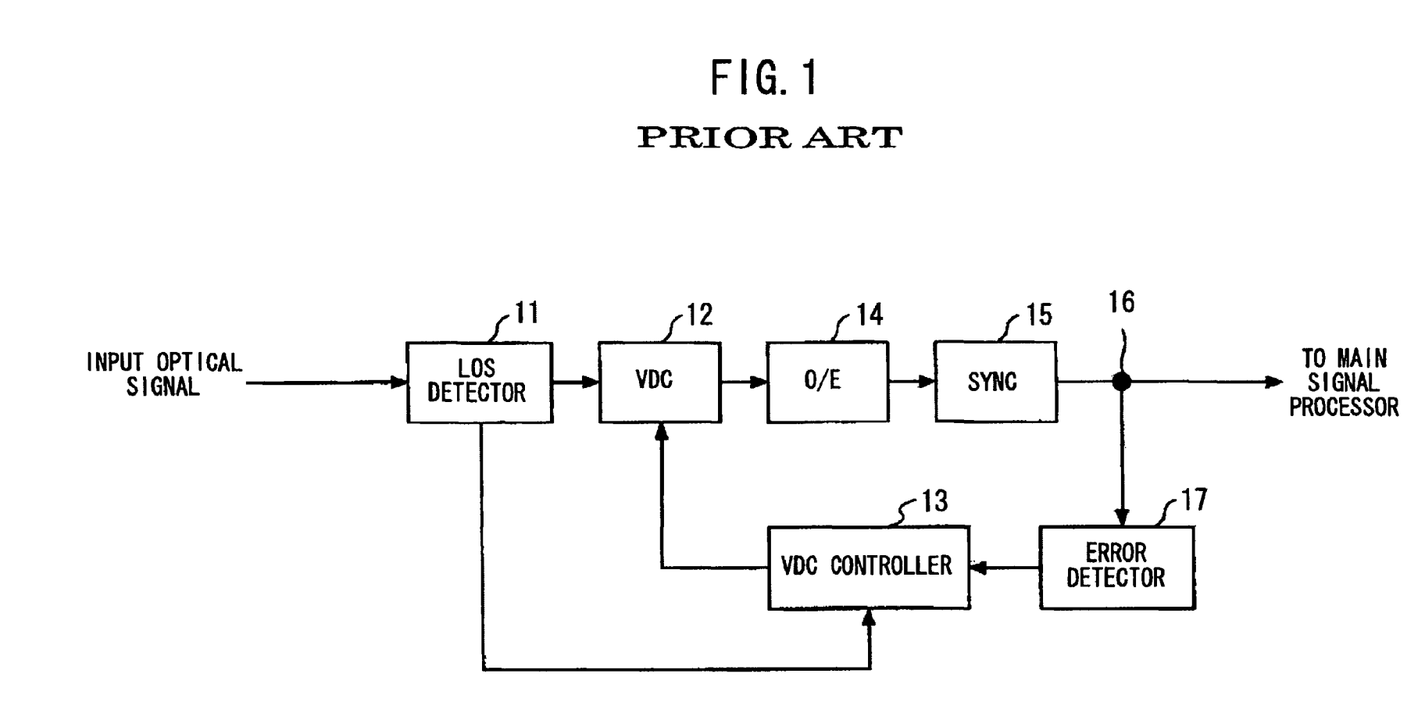
FIG. 1 is a block diagram showing an example of a VDC control circuit in a conventional transponder.

FIG. 1 is a block diagram showing an example of a VDC control circuit in a conventional transponder. In FIG. 1, an optical signal received from a transmission path is supplied to VDC 12 after loss of the optical signal (LOS: Loss Of Signal) thereof is detected in an LOS detector 11.

VDC 12 subjects a received optical signal to wavelength dispersion compensation under the control of the VDC controller 13, and supplies the optical signal concerned to an photoelectric converter (O/E) 14. The optical signal is converted to an electrical signal in the photoelectric converter 14, and a synchronous signal thereof is detected in a synchronous detector (SYNC) 15 and then supplied to a subsequent main signal processor. The synchronous signal is branched at a branch point 16, and supplied to an error detector 17. In the error detector 17, an error number per unit time is detected and then supplied to the VDC controller 13.

The VDC controller 13 varies the wavelength dispersion compensation value of VDC 12 in accordance with increase/decrease of the error number, and an optimum point at which the error is minimum is found and fixed. The VDC controller 13 stops the VDC control when the LOS detector 11 detects LOS (the loss of signal), thereby stopping the movement of the three-dimensional mirror.

Japanese Laid-open Patent Publication No. 03-79141 discloses that a timing signal is extracted from an electrical signal obtained by converting a received optical signal, data are identified from the electrical signal by controlling the phase of the timing signal, and input loss of the optical signal is identified when a phase control signal for controlling the phase exceeds a set range and also when the variation peak value exceeds a predetermined value.

SUMMARY

Various embodiments of the present invention provide a wavelength dispersion compensation control method that includes determining whether a clock component is contained in an optical signal received from an optical transmission path and, if a clock component if contained in the optical signal, extracting the clock component, and stopping control of a variable wavelength dispersion compensator when no clock component is extracted.

Various embodiments of the present invention provide a wavelength dispersion compensation control device including a clock extracting unit configured to extract a clock component from a received optical signal, a variable wavelength dispersion compensator to which the received optical signal is input, and a control stop unit configured to stop control of the variable wavelength dispersion compensator when no clock component is extracted by the clock extracting unit.

Various embodiments of the present invention provide a wavelength dispersion compensation control device including a variable wavelength dispersion compensator to which a received optical signal is input, a spectral analyzer configured to measure a spectrum of the received optical signal, an analyzing and comparing unit configured to analyze and compare a peak value of a particular wavelength and a base value of noise light that are obtained by executing spectral analysis on a signal measured by the spectral analyzer, and a control stop unit configured to stop control of the variable wavelength dispersion compensator when the peak value of the particular wavelength is not greater than the base value of the noise light.

The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

In the technique described in "BACKGROUND", in the case of out-of-synchronization (LOF: Loss Of Frame), it is not known when synchronization is established, and thus it is necessary to continue the control of changing the wavelength dispersion compensation value of VDC 12. Therefore, the conventional VDC control circuit has a problem that the VDC controller 13 continues the control of changing the wavelength dispersion compensation value of VDC 12 and continues to find out the optimum point at which the error is minimum.

Furthermore, in the case of use of an optical amplifier for a transmission path, when the level of ASE (Amplified Spontaneous Emission) light as noise light of the optical amplifier is high and, thus, is equal to an optical input loss level or more, not loss-of-signal, but loss-of-frame is established even when there is no main signal. In this case, synchronization cannot be established unless a main signal is input, and also LOS is not established, so that the optimum point is continued to be found out. Therefore, it is impossible to stop the control of changing the wavelength dispersion compensation value of VDC 12. When this state is continued for a long term, the movable portion of VDC is deteriorated, and thus the lifetime is shortened. Such a situation may normally happen when a transmission device is powered on and it is connected to an optical amplifier with no main signal is set in a transmission device at the counter side.

Embodiments of the present invention will be described with reference to the drawings.

Figure 2:
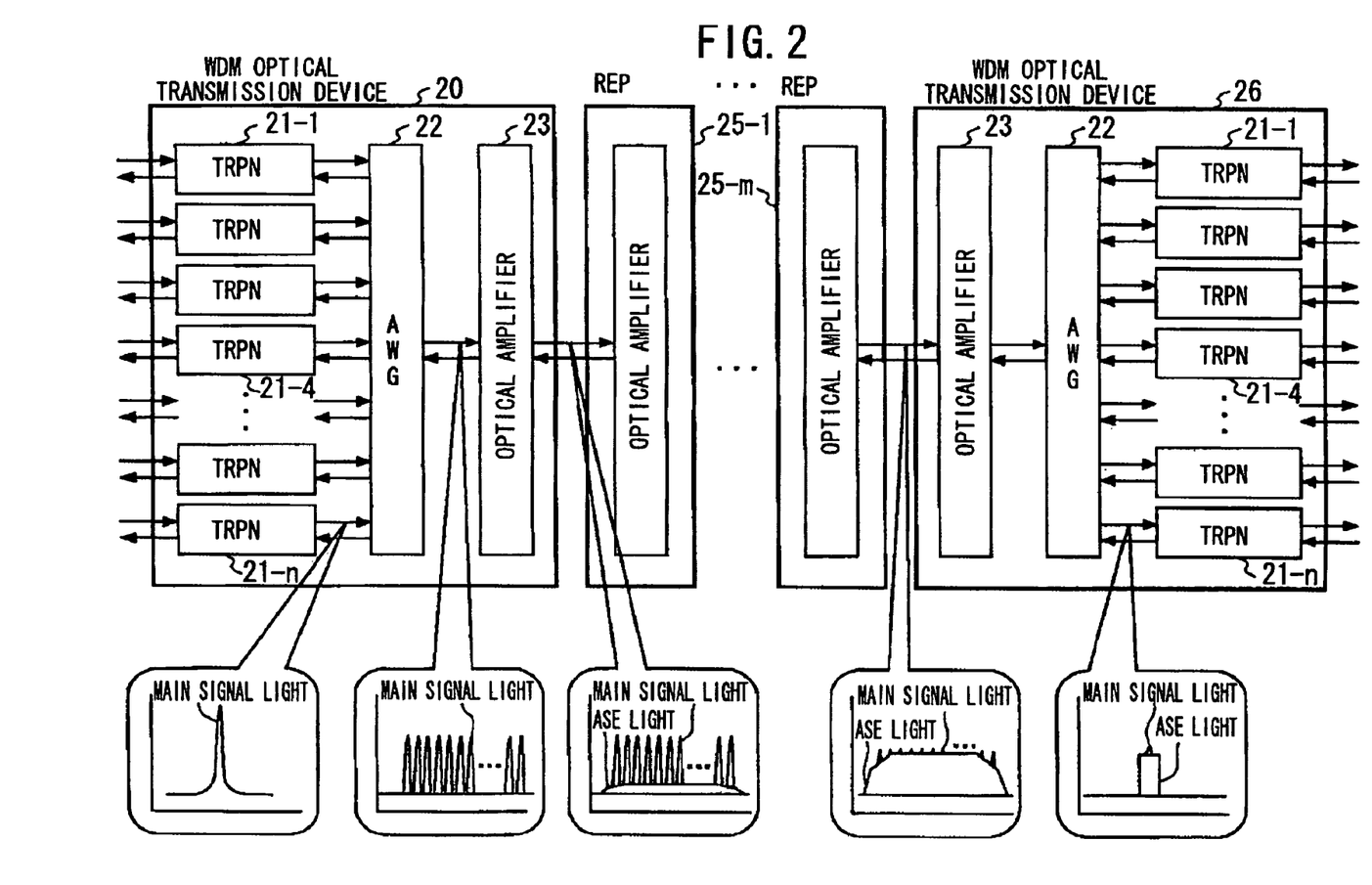
FIG. 2 is a diagram showing a system construction according to an embodiment.

FIG. 2 is a diagram showing the system construction of an embodiment of a WDM optical transmission system to which various embodiments of the present invention is applied. In FIG. 2, each of WDM optical transmission devices 20 and 26 has plural transponders 21-1 to 21-n for converting an input optical signal to an electrical signal and further converting the electrical signal to an optical signal to output, an optical multiplexer/demultiplexer (arrayed waveguide grating; hereinafter referred to as "AWG") 22 for multiplexing input optical signals from the transponders and demultiplexing an input optical signal from an optical amplifier, and an optical amplifier 23 for optically amplifying an input optical signal. Here, the transponders 21-1 to 21-n are called a transponder unit, and AWG 22 and the optical amplifier 23 are called a WDM unit.

The WDM optical transmission devices 20 and 26 are connected to each other through a WDM network. Relay devices (Repeater) 25-1 to 25-m are provided in the optical transmission path of the WDM network between the confronting WDM optical transmission devices 20 and 26, and the input optical signal is optically amplified by optical amplifiers contained in the relay devices 25.

When long-distance transmission is executed between the WDM optical transmission devices 20 and 26, the optical amplifiers 23 and the relay devices 25-1 to 25-m are disposed at the end stations and the intermediate stages of the transmission path to transmit light while amplifying the light. When the optical amplifiers 23 and the relay devices 25-1 to 25-m are connected to one another in a multistage style, ASE light occurring in the optical amplifier is increased as shown in waveform diagrams of the lower stage of FIG. 2. Accordingly, when an optical signal is received at the transponder 21-n of the WDM optical transmission device 26 at the final stage, there is a case where it is difficult to discriminate based on only the light level whether the received optical signal is signal light or ASE light.

First Embodiment

Figure 3:
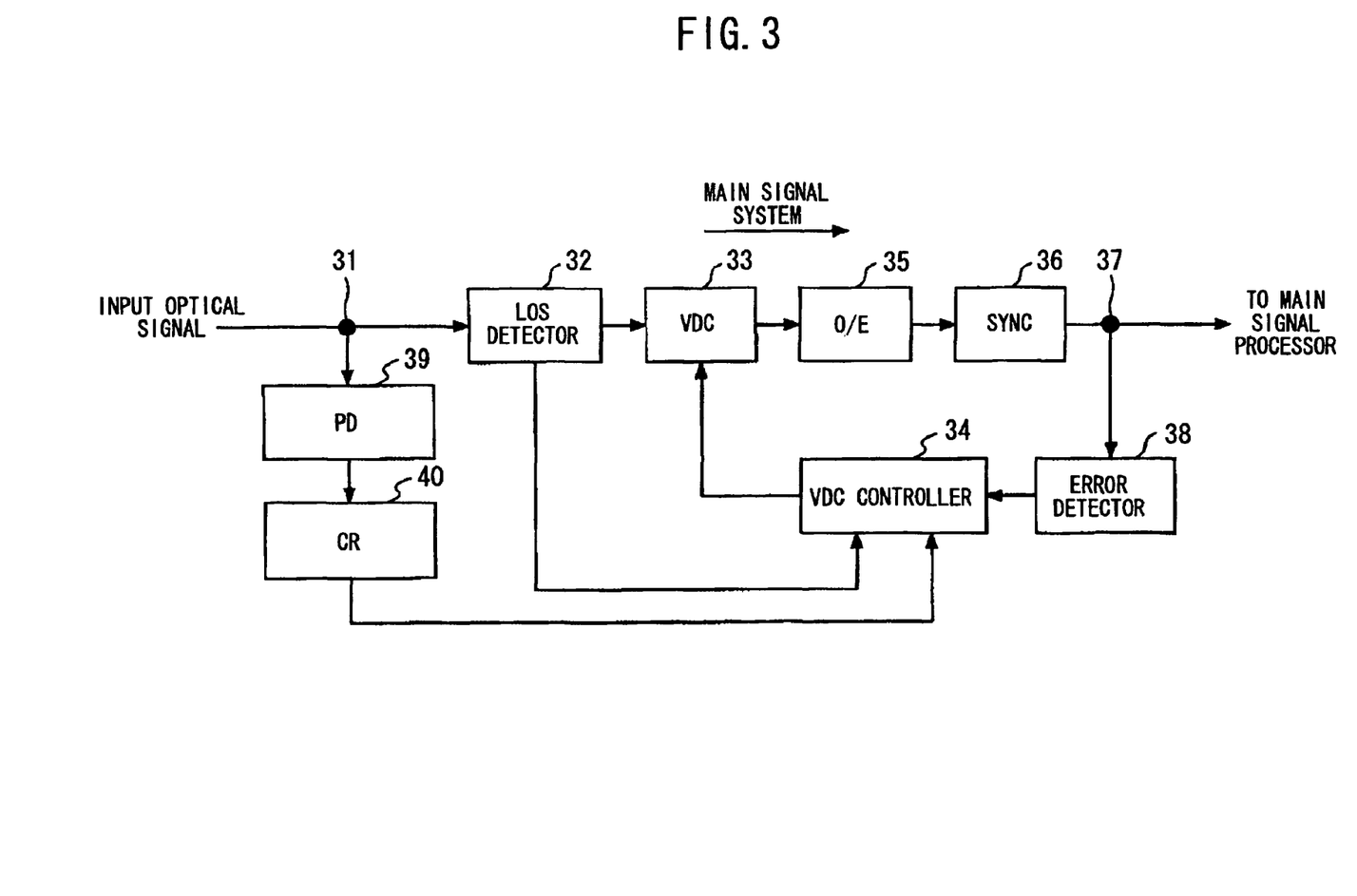
FIG. 3 is a block diagram showing the first embodiment.

FIG. 3 is a block diagram showing the first embodiment of the VDC control circuit. In FIG. 3, an optical signal supplied from AWG 22 of FIG. 2 is passed through an optical coupler 31 and supplied to the LOS detector 32 to detect loss-of-signal (LOS), and further supplied to VDC 33. In addition, an optical signal branched by the optical coupler 31 is supplied to a photodiode (PD) 39.

For example, a device which has been proposed in Japanese Laid-open Patent Publication No. 2002-258207, etc. by the applicant of this application is used as VDC 33. According to this device, light beams of respective wavelengths which are angularly dispersed and output from a VIPA (Virtually Imaged Phased Array) plate are converged by a lens. The converged light is diffracted by a grating pair serving as an optical path difference generating unit and an optical path deviation amount varying unit to generate difference among optical paths of different wavelengths, and the light is reflected by a wavelength dispersion flattening three-dimensional mirror and then input to the VIPA plate again. In this case, the light impinges against portions different in wavelength dispersion compensation amount due to the optical path difference of the three-dimensional mirror in accordance with the wavelength, and a wavelength dispersion amount which is different for every wavelength can be implemented, and the adjustment of the wavelength dispersion amount and the adjustment of the wavelength dispersion slope over the overall wavelength of the multiple-wavelength signal can be performed independently of each other.

VDC 33 executes wavelength dispersion compensation on the received optical signal under the control of a VDC controller 34, and supplies the compensated optical signal to a photoelectrical converter (O/E) 35. The optical signal is converted to an electrical signal by the photoelectrical converter 35, and supplied to a subsequent main signal processor after a synchronous signal thereof is detected in a synchronous detector (SYNC) 36. In addition, the synchronous signal is branched at a branch point 37, and supplied to an error detector 38. In the error detector 38, an error number per unit time is detected, and supplied to the VDC controller 34.

The VDC controller 34 varies the wavelength dispersion compensation value of VDC 33 by increasing/reducing the error number, and the optimum point at which the error is minimum is found out and fixed. When the VDC controller 34 is notified of detection of optical input loss (LOS) from the LOS detector 32, the VDC controller 34 stops the VDC operation and stops the movement of the three-dimensional mirror.

The photodiode 39 executes the photoelectric conversion on the input optical signal, and supplies the electrical signal to a clock recovery circuit (CR) 40. The clock recovery circuit 40 executes clock extraction (or timing regeneration), and locks a clock when a clock component is contained. The clock recovery circuit 40 notifies the VDC controller 34 as to whether the clock is locked or not. When the clock is locked in the clock recovery circuit 40, the VDC controller 34 judges the presence of a main signal, and shifts the processing to the normal VDC operation. When the clock is not locked, the VDC controller 34 judges the absence of a main signal based on LOS or ASE light reception, stops the VDC operation and stops actuation of the three-dimensional mirror.

Figure 4:
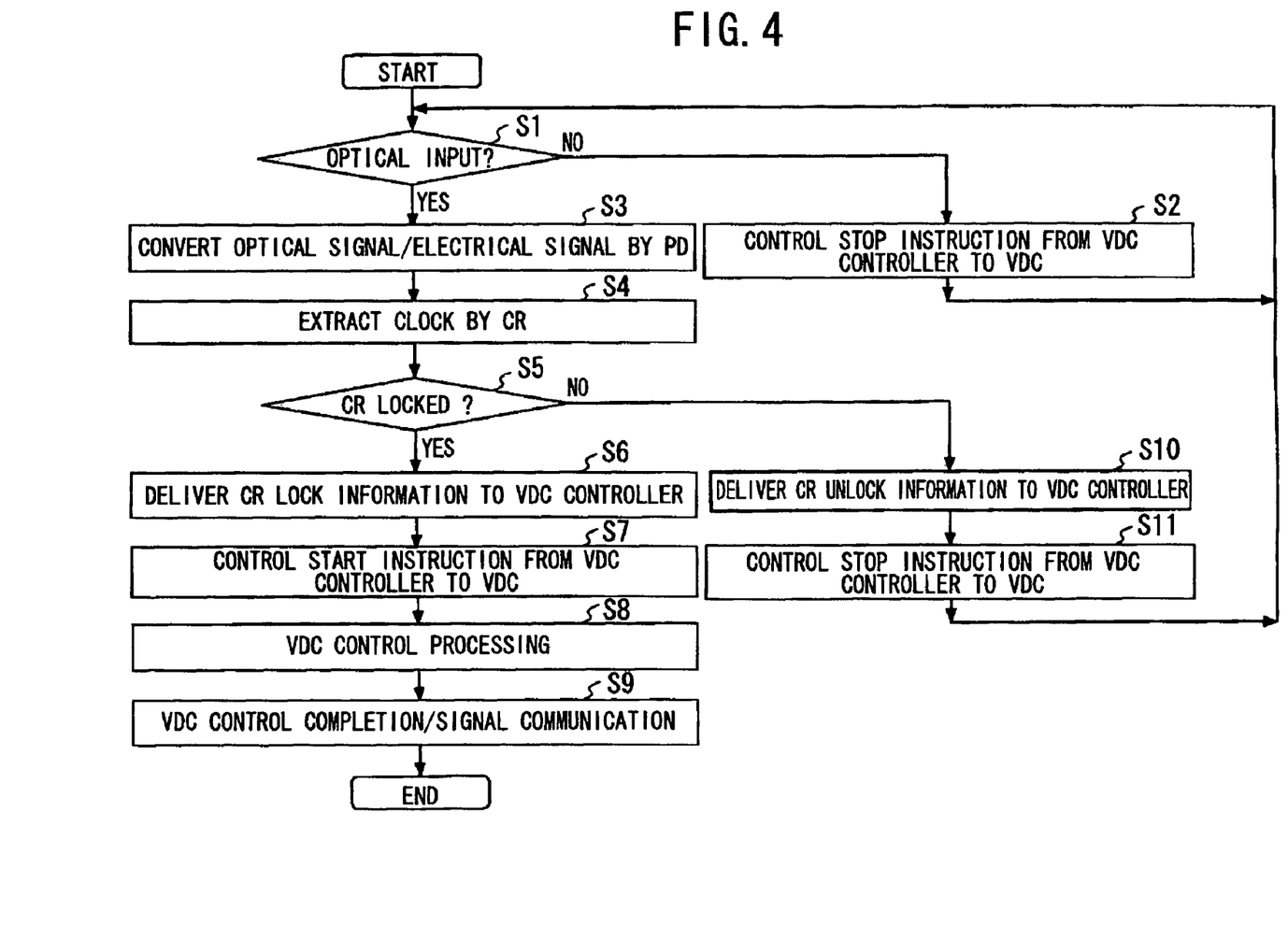
FIG. 4 is a flowchart showing the processing executed by the VDC control circuit according to the first embodiment.

FIG. 4 is a flowchart showing the processing executed by the VDC control circuit according to the first embodiment. In FIG. 4, the VDC controller 34 in FIG. 3 judges in step S1 by the LOS detector 32 whether there is any optical input. If the VDC controller 34 judges that there is no optical input, a control stop instruction is transmitted from the VDC controller 34 to VDC 33 in step S2, and the VDC control is stopped.

If the VDC controller 34 judges that there is any optical input, the processing goes to step S3 to photoelectrically convert the optical input to an electrical signal by the photodiode 39 in FIG. 3, and the obtained electrical signal is subjected to clock extraction by the clock recovery circuit 40 in FIG. 3 (step S4). If any clock component is contained, the clock recovery circuit locks the clock.

The VDC controller 34 judges in step S5 whether the clock is locked or not. If the clock is locked, the information indicating the fact that there is a main signal is notified to the VDC controller 34 in step S6, and the VDC controller 34 shifts the processing to the normal VDC operation (steps S7 to S9).

On the other hand, if the clock is not locked, information indicating that there is no main signal: LOS or ASE light reception is notified to the VDC controller 34 in step S10, and the VDC controller 34 stops the VDC operation (step S11).

Accordingly, a needless operation of VDC 33 can be omitted and the lifetime of VDC 33 can be lengthened, so that the quality of the device can be enhanced. Also, the device is economically advantageous because the lifetime of VDC is lengthened.

Second Embodiment

When the main signal is a ultra-high speed signal (for example, 40 Gb/s), an NRZ modulation system which has been hitherto used for signals of a lower speed (for example, 10 Gb/s) is unsuitable for long-distance transmission because endurance to noise of light and endurance to wavelength dispersion are weak. Therefore, when long-distance transmission is performed, it is effective to use a RZ-DQPSK (Return-to-Zero Differential Quadrature Phase shift Keying) modulation system which is advantageous in optical characteristic.

In the case of RZ-DQPSK signals having an information amount of 40 Gb/s, the optical signal rate in the transmission path is equal to a half of the information amount, that is 20 Gb/s, and this is very high speed. Accordingly, an ultra-high speed device is required to be used as the clock recovery circuit unit 40 of FIG. 3 for 20 Gb/s clock extraction. From this viewpoint, according to the second embodiment, a clock recovery circuit using a low-speed device is used.

Figure 5:
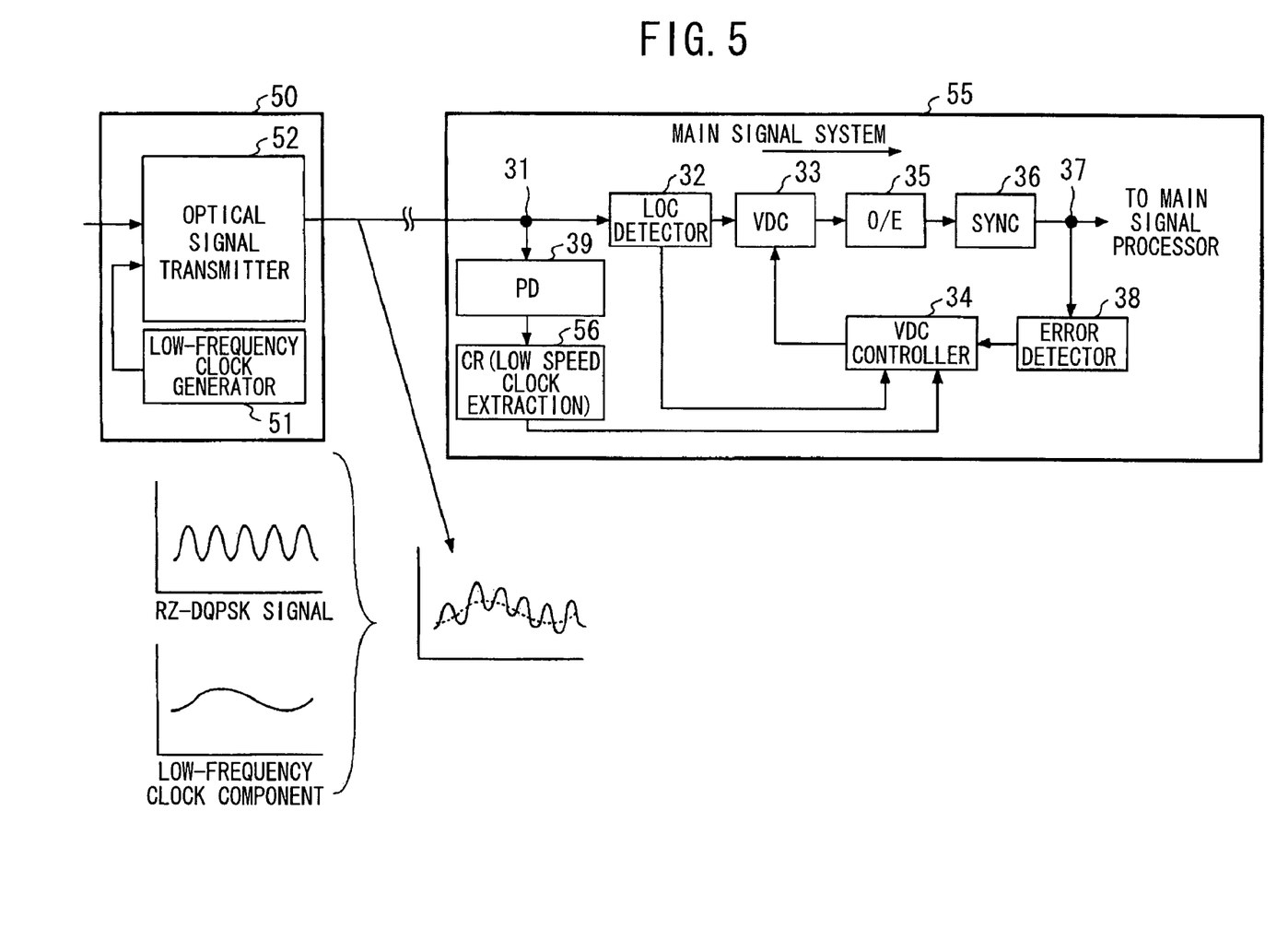
FIG. 5 is a block diagram showing a second embodiment.

FIG. 5 is a block diagram showing the second embodiment of the VDC control circuit according to the present invention. In FIG. 5, the same parts as shown in FIG. 3 are represented by the same reference numerals.

In FIG. 5, a low-frequency clock generator 51 is provided to a transponder 50 (corresponding to transponders 21-1 to 21-n) of the WDM optical transmission device 20 at the transmission side, and a low-frequency clock component generated in the low-frequency clock generator 51 is superposed on an RZ-DQPSK signal of 40 Gb/s at an optical signal transmitter 52 and transmitted to a transmission path.

In a transponder 55 (corresponding to transponders 21-1 to 21-n) of the WDM optical transmission device 26 at the reception side, an optical signal supplied from AWG 22 is passed through the photocoupler 31 and supplied to the LOS detector 32 to detect Loss-Of-Signal (LOS), and then supplied to VDC 33. In addition, an optical signal branched by the photocoupler 31 is supplied to the photodiode (PD) 39.

VDC 33 executes wavelength dispersion compensation on a received optical signal under the control of the VDC controller 34 and supplies the compensated optical signal to the photoelectric converter (O/E) 35. The optical signal is converted to an electrical signal by the photoelectric converter 35, a synchronous signal is detected in the synchronous detector (SYNC) 36, and then the optical signal is supplied to a subsequent main signal processor. In addition, the synchronous signal is branched at the branch point 37, and supplied to the error detector 38. In the error detector 38, the number of errors per unit time is detected, and the detected error number is supplied to the VDC controller 34.

The VDC controller 34 changes the wavelength dispersion compensation value of VDC 33 by increasing/reducing the error number concerned, and finds out and fix the optimum point at which the error is minimum. Furthermore, the VDC controller 34 stops the VDC operation to stop the movement of the three-dimensional mirror when detection of optical input loss is notified from the LOS detector 32.

On the other hand, the photodiode 39 converts an optical signal to an electrical signal, and supplies the electrical signal to a clock recovery circuit (CR) 56. Here, the second embodiment is different form the first embodiment in the clock recovery circuit unit 56. In this case, it is unnecessary to extract a high-speed clock, and thus a high-speed device is unnecessary. Therefore, an inexpensive device which can extract a low-speed clock is used. The clock recovery circuit 56 carries out clock extraction, and when a clock component is contained, the clock recovery circuit 56 locks the clock. The clock recovery circuit 56 notifies the VDC controller 34 of the information indicating whether the clock is locked. When the clock recovery circuit 56 locks the clock, the VDC controller 34 judges that there is a main signal, and shifts the processing to the normal VDC. When the clock is not locked, the VDC controller 34 judges that there is no main signal due to LOS or ASE light reception, and stops the VDC operation to thereby stop the movement of the three-dimensional mirror.

Figure 6:
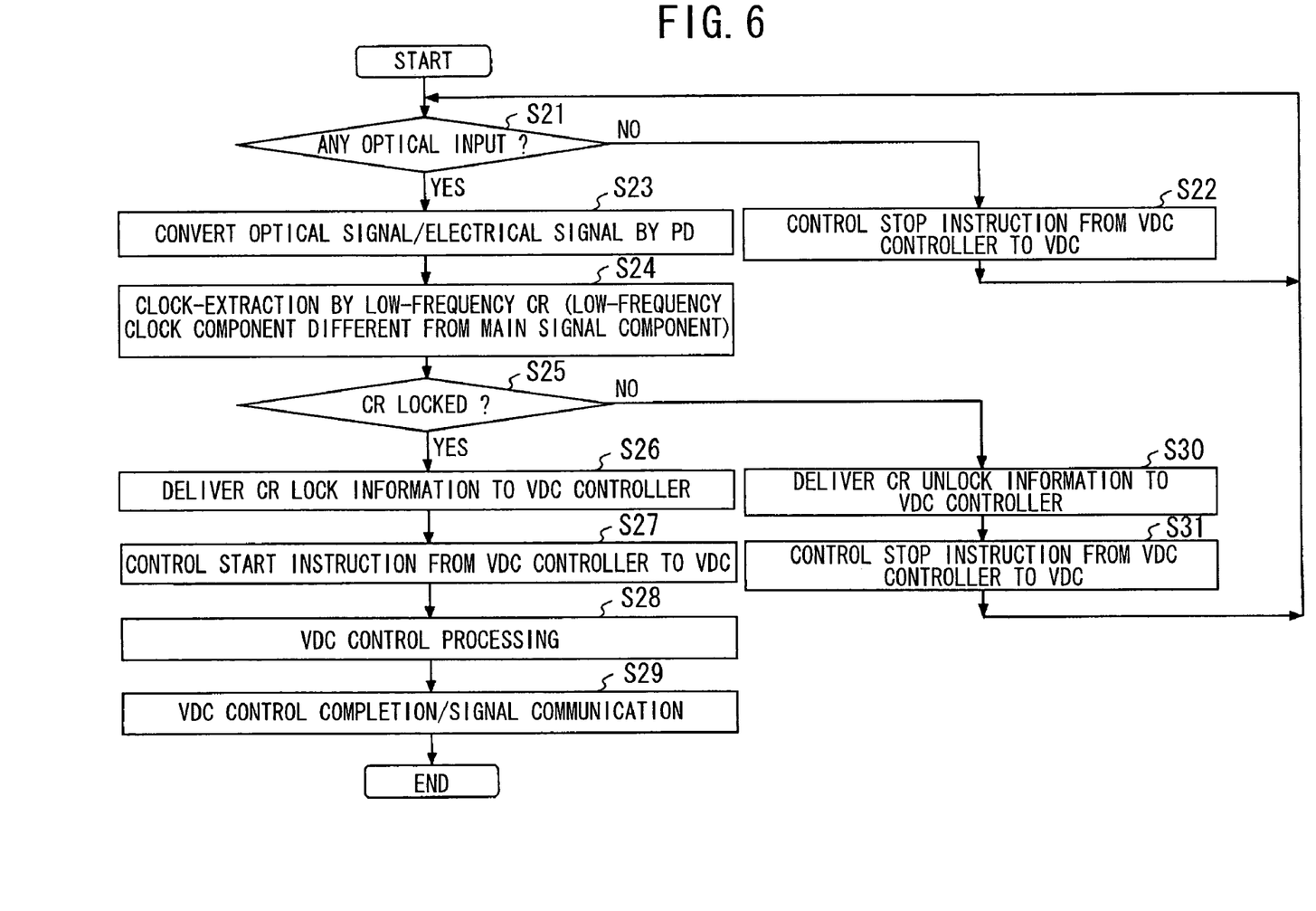
FIG. 6 is a flowchart showing the processing executed by a VDC control circuit according to the second embodiment.

FIG. 6 is a flowchart showing the processing executed by the VDC control circuit of the second embodiment. In FIG. 6, it is judged in step S21 by the LOS detector 32 whether there is an optical input. If it is judged that there is no optical input, a control stop instruction is transmitted from the VDC controller 34 to VDC 33 in step S22, and the VDC control is stopped.

If it is judged that there is an optical input, the processing goes to step S23 to perform the photoelectric conversion through the photodiode 39, and the obtained electrical signal is subjected to clock extraction by the clock recovery circuit 56 (step S24). If a clock component is contained, the clock recovery circuit locks the clock.

It is judged in step S25 whether the clock is locked or not. If the clock is locked, information indicating this fact (there is a main signal) is notified to the VDC controller 34 in step S26, and the VDC controller 34 shifts the processing to the normal VDC operation (steps S27 to S29).

On the other hand, if the clock is not locked, information indicating the fact (there is no main signal: LOS or ASE light reception) is notified to the VDC controller 34 in step S30, and the VDC controller 34 stops the VDC operation (step S31).

Accordingly, the needless operation of VDC 33 can be omitted, and the lifetime of VDC 33 can be lengthened, so that the quality of the device can be enhanced. Also, the device is economically advantageous because the lifetime of VDC is lengthened.

When the RZ-DQPSK modulation system of 40 Gb/s is adopted, LOS or ASE light reception and also the absence of the main signal may be detected by extracting the clock component of the RZ-DQPSK modulation signal. However, in this case, a demodulation circuit for RZ-DQPSK is required to detect the signal component.

Figure 7:
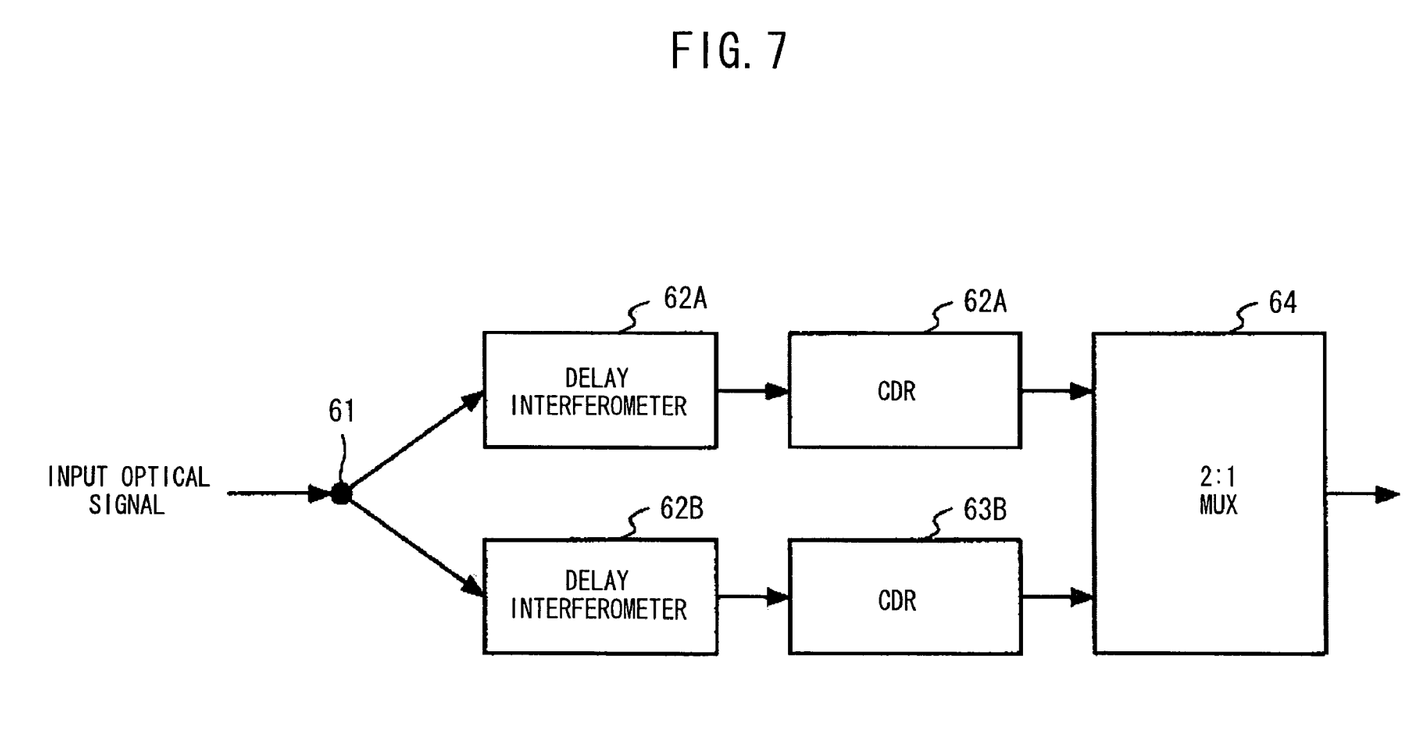
FIG. 7 is a block diagram showing a demodulator circuit for RZ-DQPSK.

As shown in FIG. 7, the demodulation circuit for RZ-DQPSK comprises a photocoupler 61, delay interferometers 62A, 62B, CDR (clock data recovery circuits) 63A, 63B, and a 2:1 multiplexing circuit (MUX) 64. In this case, the presence or absence of the main signal can be judged by varying the phase of the delay interferometers 62A, 62B and detecting the variation of the phase amount which is detected in accordance with the variation of the phase of the delay interferometers 62A, 62B. However, according to this method, it takes a time to control and stabilize the phase of the delay interferometers 62A, 62B, and this time is from several seconds to several minutes.

According to the second embodiment, the clock component is extracted from the electrical waveform converted by the photodiode 39 in the clock recovery circuit 56, and the presence or absence of the main signal can be judged on the basis of the judgment as to whether the clock is locked or not. Therefore, the presence or absence of the optical signal can be judged in a short time.

Third Embodiment

Figure 8:
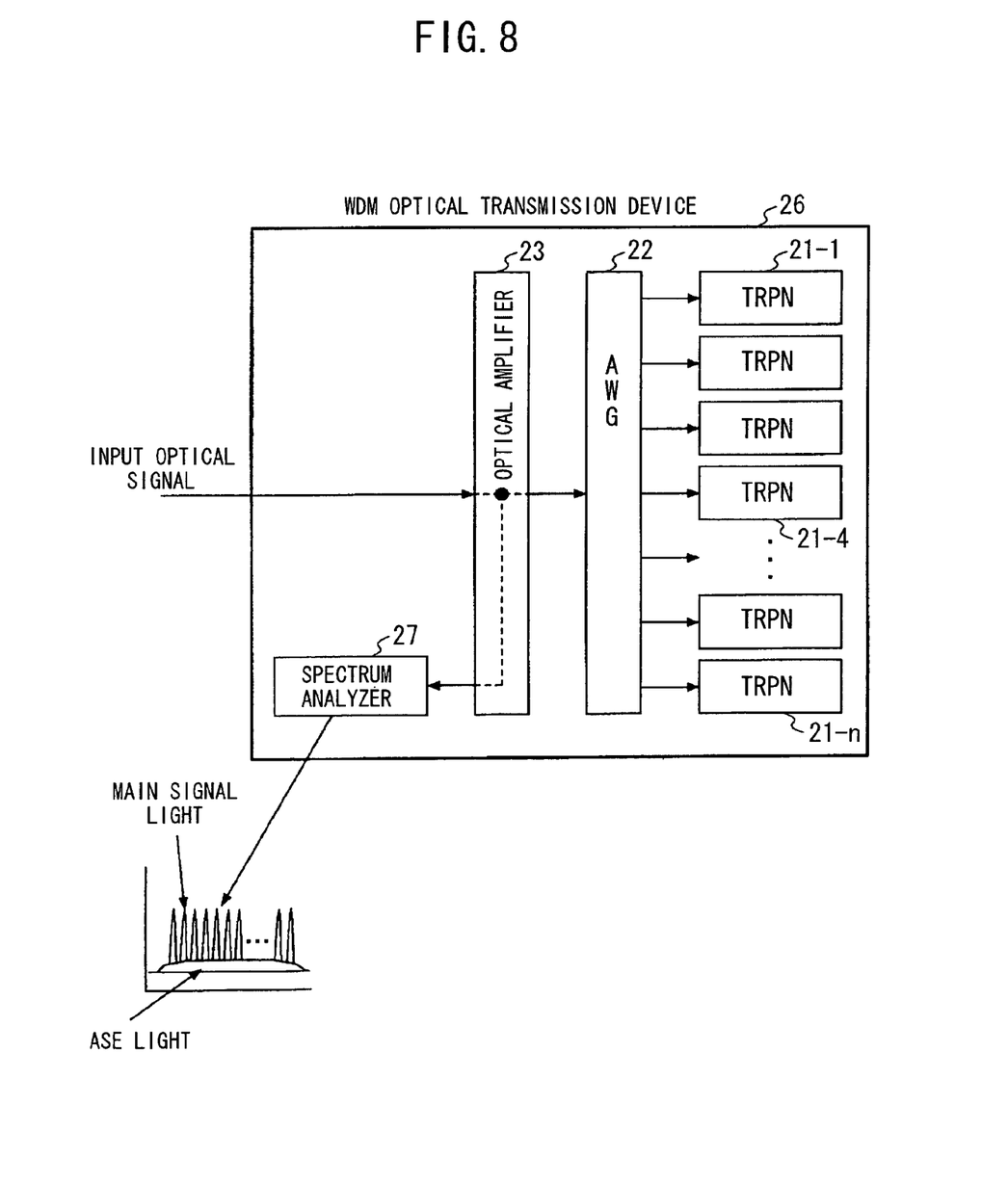
FIG. 8 is a block diagram showing a general WDM optical transmission device.

As shown in FIG. 8, in the case of the WDM optical transmission device, a spectral analyzer 27 frequently exists in the WDM unit to measure the light peak power and OSNR (optical SN ratio) of each wavelength-multiplexed channel.

Figure 9:
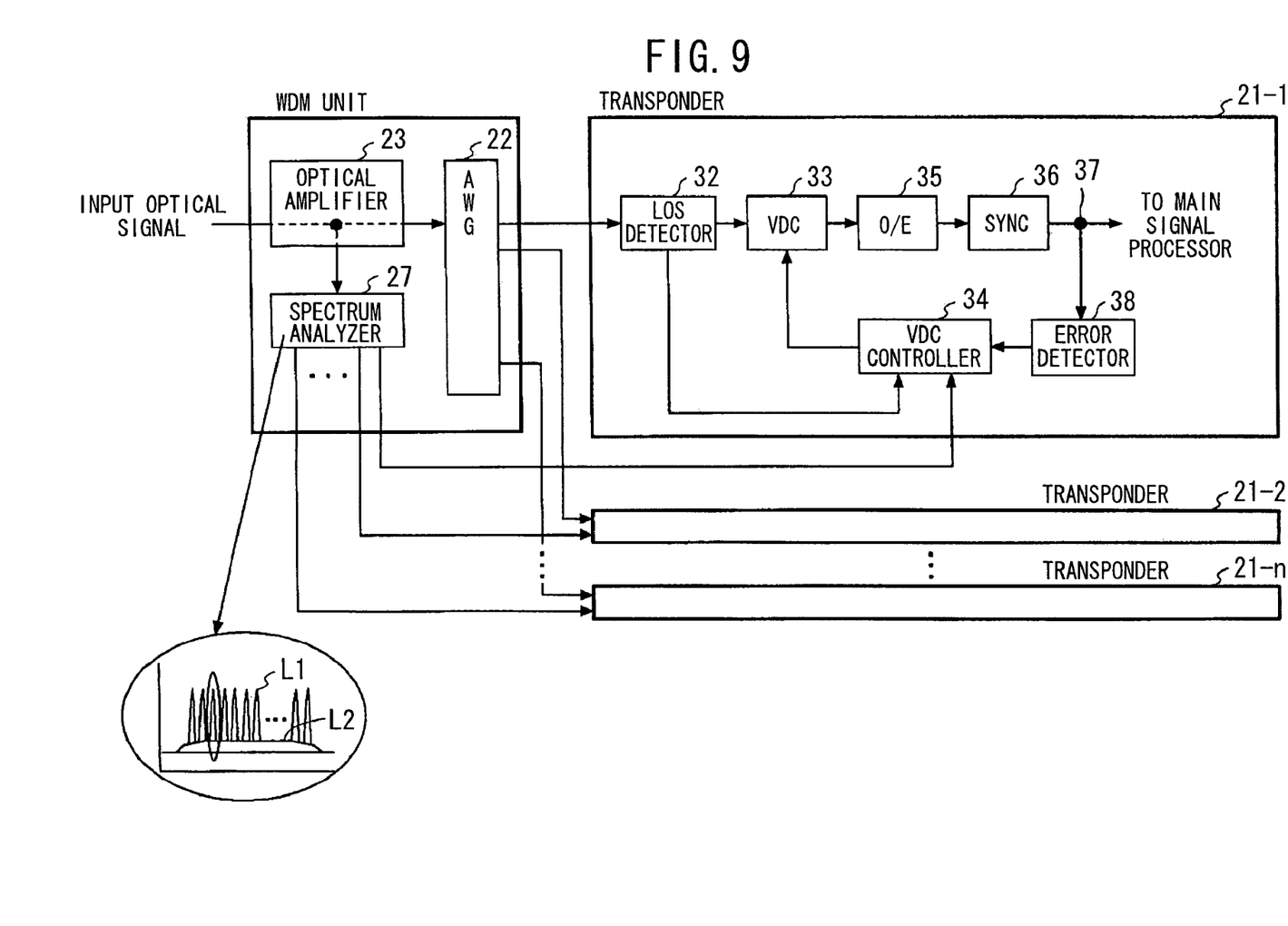
FIG. 9 is a block diagram showing a third embodiment.

FIG. 9 is a block diagram showing a third embodiment of the VDC control circuit according to the present invention. In FIG. 9, the spectral analyzer 27 is provided to the WDM optical transmission device 26 at the reception side. The spectral analyzer 27 creates spectrum information of an optical signal (WDM signal) supplied from the optical amplifier 23, detects the peak value L1 of each wavelength and the base value L2 of ASE light from the spectrum information, compares each peak value and the ASE base value to judge the presence or absence of the main signal, and notifies the judgment result to the VDC controller 34 of the transponder 21-1 to 21-n of each wavelength.

In each of the transponders 21-1 to 21-n, the optical signal supplied from AWG 22 is supplied to the LOS detector 32 to detect Loss-Of-Signal (LOS), and supplied to VDC 33.

VDC 33 executes the wavelength dispersion compensation on the received optical signal under the control of the VDC controller 34, and supplies the compensated optical signal to the photoelectric converter (O/E) 35. The optical signal is converted to an electrical signal in the photoelectric converter 35, a synchronous signal is detected in the synchronization detector (SYNC) 36, and the optical signal is supplied to the subsequent main signal processor. The synchronous signal is branched at the branch point 37, and supplied to the error detector 38. In the error detector 38, the error number per unit time is detected, and supplied to the VDC controller 34.

The VDC controller 34 changes the wavelength dispersion compensation value of VDC 33 by increasing/reducing the error number, and finds out and fixes the optimum point at which the error is minimum. Furthermore, the VDC controller 34 stops the VDC operation and stops the movement of the three-dimensional mirror when the detection of the optical input loss is notified from the LOS detector 32.

When the presence of the main signal is notified from the spectral analyzer 27 to the VDC controller 34, the VDC controller 34 shifts the processing to the normal VDC operation. When the absence of the main signal is notified, the VDC controller 34 stops the VDC operation to stop the movement of the three-dimensional mirror.

Figure 10:
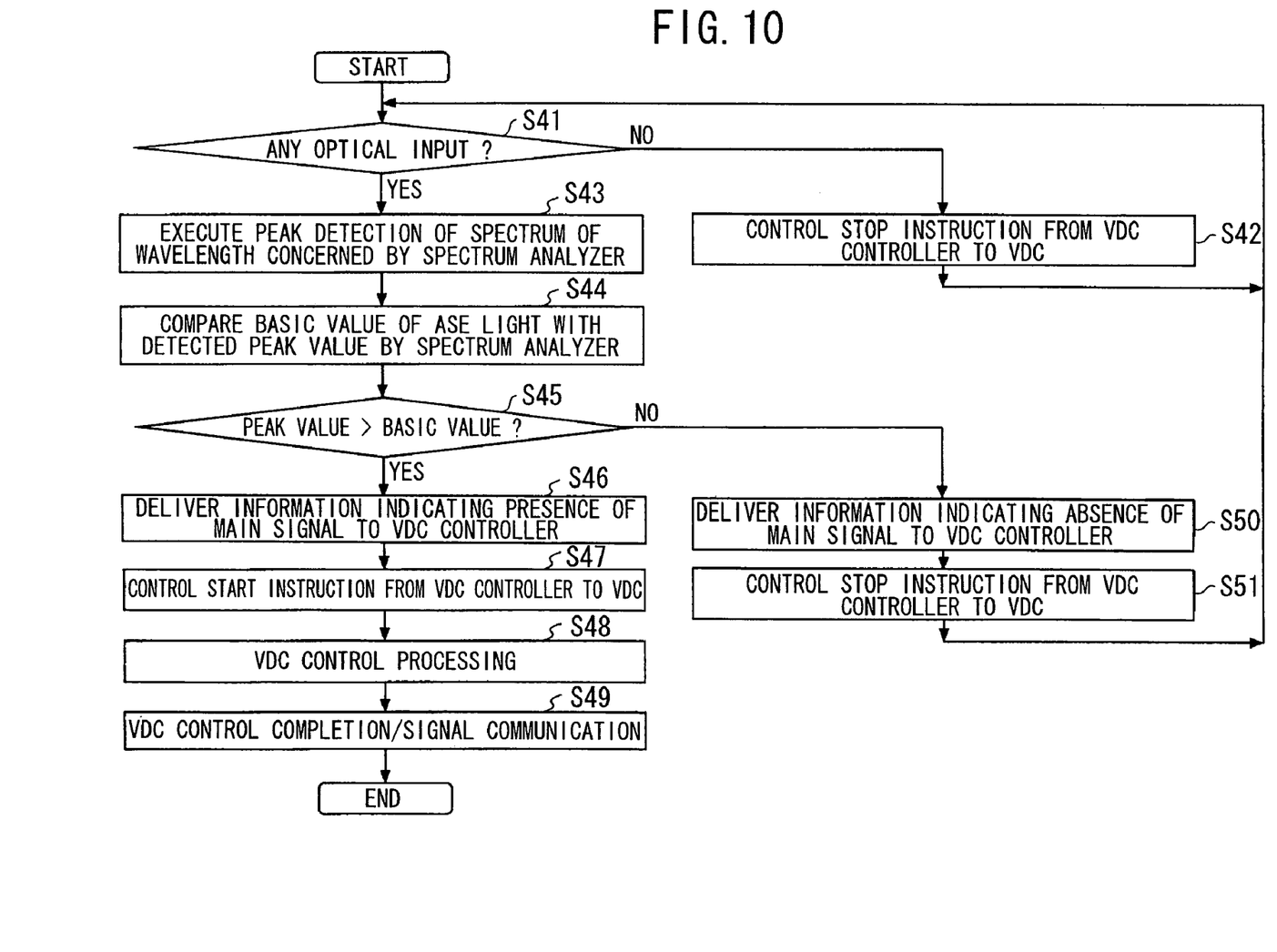
FIG. 10 is a flowchart of the processing executed by a VDC control circuit according to the third embodiment.

FIG. 10 is a flowchart showing the processing executed by the VDC control circuit of the third embodiment. In FIG. 10, it is judged in step S41 by the LOS detector 32 whether there is an optical input. If it is judged that there is no optical input, a control stop instruction is transmitted from the VDC controller 34 to VDC 33 in step S42, and the VDC control is stopped.

If it is judged that there is an optical input, the processing goes to step S43, and the spectral analyzer 27 detects the peak value of the wavelength concerned from the spectrum information, detects the base value of ASE light in step S44 and compares the base value with the peak value of the wavelength concerned. If the peak value is larger than the base value in step S45, the presence of the main signal is judged, information indicating this fact (the presence of the main signal) is notified to the VDC controller 34 in step S46 and the VDC controller 34 shifts the processing to the normal VDC operation (steps S47 to S49).

On the other hand, if there is no main signal (peak value≦base value), information indicating this fact (the absence of the main signal) is notified to the VDC controller 34 in step S50, and the VDC controller 34 stops the VDC operation (step S51).

Accordingly, a needless operation of VDC 33 can be eliminated, and the lifetime of VDC 33 can be lengthened, so that the quality of the device can be enhanced. Also, the device is economically advantageous because the lifetime of VDC is lengthened.

Figure 11:
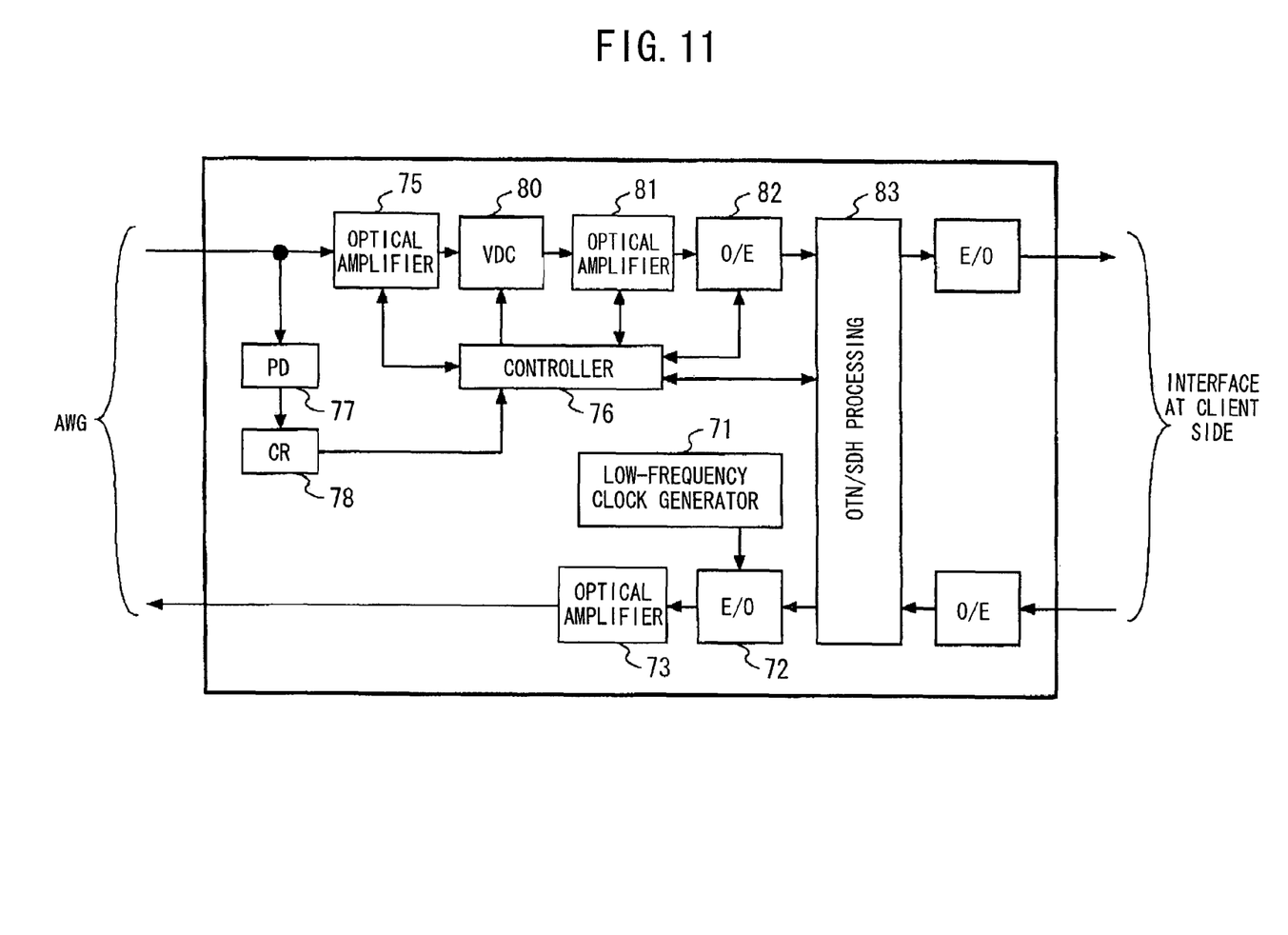
FIG. 11 is a detailed block diagram showing a transponder in the second embodiment.

FIG. 11 is a detailed block diagram showing the transponder of the second embodiment. In FIG. 11, a low-frequency clock generated in a low-frequency clock generator 71 is transmitted to an E/O unit 72, and a main signal and a low-frequency clock are superposed on each other in the E/O unit 72. The output thereof is amplified in an optical amplifier 73 and then output therefrom.

The optical signal is multiplexed in AWG 22 of the WDM optical transmission device 20 shown in FIG. 2, amplified in the optical amplifier 23 and then transmitted to the transmission path. The optical signal transmitted to the transmission path is optically amplified in the relay devices 25-1 to 25-m, and input to the WDM optical transmission device (2). The optical signal concerned is amplified by the optical amplifier 23 of the WDM optical transmission device 26, demultiplexed in AWG 22 and then supplied to the transponders 21-1 to 21-n for every wavelength.

With respect to the optical signal supplied to the transponder shown in FIG. 11, the loss-of-signal (LOS) is detected in an optical amplifier 75. In the case of LOS, the optical signal information is transmitted to a controller 76 containing the VDC controller 34, and the VDC control is stopped.

In the case of no LOS, the optical signal is photoelectrically converted in a photodiode 77, and a low-speed clock different from the main signal is extracted in a clock recovery circuit 78. When the clock can be extracted in the clock recovery circuit 78, the clock recovery circuit 78 locks the clock. Information indicating the locking of the clock is transmitted to the controller 76, and the wavelength dispersion compensation operation of VDC 80 is started. When the wavelength dispersion compensation operation is completed, it becomes possible to execute the main signal processing on the main signal amplified in an optical amplifier 81 and photoelectrically converted in an O/E 82 in an OTN/SDH (optical Transport Network/Synchronous Digital Hierarchy) processor 83, and the main signal is communicated.

When it is impossible to extract a low-speed clock component in the clock recovery circuit 78 and thus the clock recovery circuit 78 does not lock the clock, unlock information is transmitted to the controller 76, and a control stop instruction is output from the controller 76 to VDC 80, whereby VDC 80 stops the operation thereof. Thereafter, if the clock recovery circuit 78 locks the clock, start of the control is instructed from the controller 76 to VDC 80, whereby the wavelength dispersion control can be started.

By assembling the device as described above, needless VDC control is not executed, and thus the lifetime of VDC can be lengthened.

Figure 12:
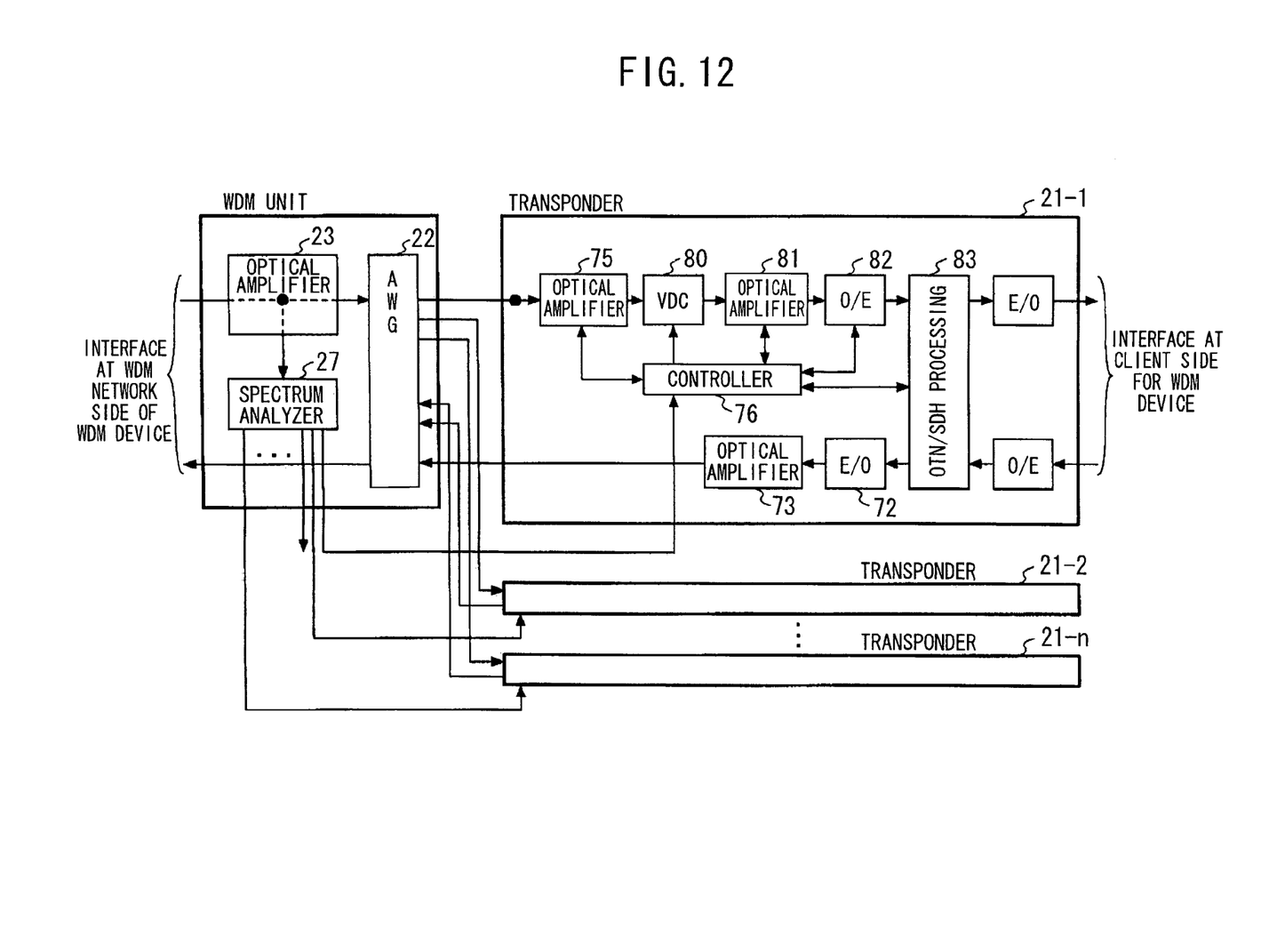
FIG. 12 is a detailed block diagram showing a transponder in the third embodiment.

FIG. 12 is a detailed block diagram showing the transponder of the third embodiment. In FIG. 12, the same parts as shown in FIG. 11 are represented by the same reference numerals, and the description thereof is omitted.

In FIG. 12, a photocoupler is disposed in the optical amplifier 23 of the WDM optical transmission device 20, 26, and an optical signal (WDM signal) is branched to a signal directed to AWG 22 and a signal directed to the spectral analyzer 27. In the spectral analyzer 27, the spectrum information of each wavelength of the WDM signal can be monitored. In this spectral analyzer 27, the spectrum information of the corresponding transponder 21-1 is noted, and the peak of the wavelength thereof is detected. Furthermore, the base value of ASE light is detected, and the base value and the peak value are compared with each other. If the peak value is greater than the base value, it is judged that there is a main signal (i.e. the presence of the main signal is judged), and the information indicating the presence of the main signal is delivered to the controller 76 of the transponder 21-1.

In the controller 76, the information indicating the presence of the main signal is received, and the control of VDC 80 is started. It becomes possible to execute the main signal processing in the OTN/SDH processor 83 at the rear stage, and the main signal is communicated. The transponder 21-1 is not provided with the low-frequency clock generator 71.

If the peak value is less than or equal to the base value in the spectral analyzer 27, it is judged that there is no main signal (i.e., the absence of the main signal is judged), and the information indicating the absence of the main signal is delivered to the controller 76 of the transponder 21-1.

The controller 76 receives this information and stops the control of VDC 80. Thereafter, when the peak value is greater than the base value in the spectral analyzer 27 and the presence of the main signal is judged, the VDC control can be started at any time.

By assembling the device as described above, needless VDC control is not executed, and thus the lifetime of VDC can be lengthened.

In the above-described embodiments, the photodiode 39 and the clock recovery circuit 40 are used as an example of a clock extracting unit, the VDC controller 34 is used as an example of a control stop unit, the photodiode 39 and the clock recovery circuit 56 are used as an example of a low-frequency clock extraction unit, and the spectral analyzer 27 is used as an example of an analyzing and comparing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A wavelength dispersion compensation control method comprising:
    determining whether a clock component is contained in an optical signal received from an optical transmission path and, if a clock component if contained in the optical signal, extracting the clock component; and
    stopping control of a variable wavelength dispersion compensator when no clock component is extracted.

2. The wavelength dispersion compensation control method according to claim 1, wherein the optical signal received from the optical transmission path is generated by superposing a low-frequency clock on a main signal, and the clock component to be extracted is the low-frequency clock.

3. A wavelength dispersion compensation control device comprising:
    a clock extracting unit configured to extract a clock component from a received optical signal;
    a variable wavelength dispersion compensator to which the received optical signal is input; and
    a control stop unit configured to stop control of the variable wavelength dispersion compensator when no clock component is extracted by the clock extracting unit.

4. The wavelength dispersion compensation control device according to claim 3, wherein the clock extracting unit extracts a superposed low-frequency clock component contained in the received optical signal.

5. The wavelength dispersion compensation control device according to claim 3, wherein the variable wavelength dispersion compensator has an actuation portion at which a wavelength dispersion compensation value thereof is varied.

6. A wavelength dispersion compensation control device comprising:
    a variable wavelength dispersion compensator to which a received optical signal is input;
    a spectral analyzer configured to measure a spectrum of the received optical signal;
    an analyzing and comparing unit configured to analyze and compare a peak value of a particular wavelength and a base value of noise light that are obtained by executing spectral analysis on a signal measured by the spectral analyzer; and
    a control stop unit configured to stop control of the variable wavelength dispersion compensator when the peak value of the particular wavelength is not greater than the base value of the noise light.

* * * * *